United States Patent
Lee

(10) Patent No.: US 6,952,251 B2
(45) Date of Patent: Oct. 4, 2005

(54) METHOD FOR FORMING DATA LINES OF A LIQUID CRYSTAL DISPLAY DEVICE

(75) Inventor: Hu-Kag Lee, Kyoungeangbuk-Do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/231,105

(22) Filed: Aug. 30, 2002

(65) Prior Publication Data

US 2003/0058379 A1 Mar. 27, 2003

(30) Foreign Application Priority Data

Aug. 30, 2001 (KR) ........................................ 2001-52908

(51) Int. Cl.$^7$ ............................................. G02F 1/1345
(52) U.S. Cl. ........................ 349/152; 349/147; 349/149
(58) Field of Search ............................ 349/42, 43, 147, 349/149, 151, 152; 257/59, 72; 438/30

(56) References Cited

U.S. PATENT DOCUMENTS

| | | | | |
|---|---|---|---|---|
| 5,456,978 A | * | 10/1995 | Lal et al. | 428/332 |
| 5,919,580 A | * | 7/1999 | Barnard et al. | 428/692 |
| 6,414,730 B1 | * | 7/2002 | Akamatsu et al. | 349/43 |
| 6,493,048 B1 | * | 12/2002 | Baek et al. | 349/43 |
| 6,628,361 B2 | * | 9/2003 | Takahashi et al. | 349/139 |
| 2002/0180898 A1 | * | 12/2002 | Yoo et al. | 349/43 |

* cited by examiner

*Primary Examiner*—Dung T. Nguyen
*Assistant Examiner*—Michael H Caley
(74) *Attorney, Agent, or Firm*—Birch, Stewart, Kolasch & Birch, LLP

(57) ABSTRACT

A method for forming data lines of a liquid crystal display device, wherein a double data line is adopted as a data line while the contact resistance with a transparent electrode is maintained at the same level as in the conventional art, whereby about 150 seconds of sputter equipment use time for forming the triple data line in the conventional art can be reduced to about 85 seconds by forming the double data line. The double data line of a pad part is used as a source/drain region at a TFT part, so that a CD bias at the source/drain region metal layer is improved.

20 Claims, 3 Drawing Sheets

METHOD FOR FORMING DATA LINES OF A LIQUID CRYSTAL DISPLAY DEVICE

BACKGROUND OF THE INVENTION

1. Field of the Invention

The present invention relates to a method for forming data lines of a liquid crystal display, and more particularly, to a method for forming data lines of a liquid crystal display device that is capable of simplifying the stacking structure of data lines.

2. Description of the Background Art

In general, a liquid crystal display device displays a desired picture by individually supplying a data signal according to picture information to the liquid crystal cell arranged in a matrix form and controlling the light transmittance of the liquid crystal cells.

The liquid crystal display device includes a liquid crystal display panel on which liquid crystal cells of a pixel unit are arranged in a matrix form, and a drive integrated circuit (IC) for driving the liquid crystal cells.

The liquid crystal display panel includes a color filter substrate and a thin film transistor array substrate that face each other and a liquid crystal introduced between the color filter substrate and the thin film transistor array substrate.

On the thin film transistor array substrate of the liquid crystal display panel, there are a plurality of data lines for transmitting a data signal supplied from a data driver integrated circuit to the liquid crystal cell and a plurality of gate lines for transmitting a scan signal supplied from a gate driver integrated circuit to the liquid crystal cells. The liquid crystal cells are defined at each portion where the data lines and the gate lines cross each other.

The gate driver integrated circuit sequentially supplies a scan signal to the plurality of gate lines so that the liquid crystal cells arranged in a matrix form are sequentially selected line by line. A data signal is supplied from the data driver integrated circuit to the selected line of the liquid crystal cells.

A common electrode and a pixel electrode are formed with the color filter substrate and the thin film transistor array substrate facing each other for applying an electric field to the liquid crystal layer.

The pixel electrode is formed by liquid crystal cells on the thin film transistor array substrate, while the common electrode is integrally formed on the entire surface of the color filter substrate.

Accordingly, by controlling the voltage applied to the pixel electrode while a voltage is applied to the common electrode, the light transmittance of the liquid crystal cells can be individually controlled.

In order to control the voltage applied to the pixel electrode by each liquid crystal cell, a thin film transistor used as a switching device is formed at each liquid crystal cell.

With its merits of being thin and light, the liquid crystal display device has encroached on the next-generation monitor market in place of the CRT monitor, and as its adaptation coverage is being extended to television sets, a high resolution and large screen are a necessary demand for the device.

In order to meet the requirement of high resolution and large screen, development of a data line with a low resistance is a first requirement to minimize delay of a data signal.

However, since the line material, such as Cr, Mo or MoW, adopted for the liquid crystal display device has a high nonresistance, it can not be adopted for data lines, and thus a triple film structure of a lower buffer metal layer/aluminum layer/upper buffer metal layer is adopted.

The lower buffer metal layer is used to prevent the occurrence of a spiking phenomenon caused by the diffusion of aluminum portions of the aluminum layer, the main line, to the lower film, and the upper buffer metal layer is used to solve the contact resistance problem with a transparent electrode (ITO or IZO) which is in contact with the aluminum layer.

The conventional method for forming data lines of a liquid crystal display device will now be described in detail with reference to FIGS. 1A through 1D showing sequential sectional views thereof.

First, as shown in FIG. 1A, a gate electrode 2 is patterned on a TFT part of a glass substrate 1, and a SiNx film is formed as a gate insulation film 3 on the entire surface of the TFT part and the pad part.

Then, an amorphous silicon layer 4A and high concentration n+doping amorphous silicon layer 4B are sequentially formed at an upper portion of the gate insulation film 3 and patterned to form an active layer 4 aligned with the gate electrode 2 of the TFT part.

Next, a lower buffer metal layer 5, an aluminum layer 6 and an upper buffer metal layer 7 are sequentially formed on the entire upper portion of the resulting structure.

The buffer metal layer 5 is formed to prevent the occurrence of the spiking phenomenon caused as the aluminum layer 6, the main line, may diffuse to the lower film such as the active layer 4 and the gate insulation film 3, by utilizing a metal material such as Cr, Mo, MoW or Ti of Group VI or Group 3A of the periodic table.

The upper buffer metal layer 7 is formed to solve the contact resistance problem with the aluminum layer 6 and the transparent electrode 9 by utilizing the metal material such as Cr, Mo, MoW or Ti of the Group VI or Group 3A of the periodic table.

As shown in FIG. 1B, the lower buffer metal layer 5, the aluminum layer 6 and the upper buffer metal layer 7 stacked on the TFT part are patterned until the amorphous silicon layer 4A on the gate electrode 2 is exposed to separate source/drain regions, and at the same time, the buffer metal layer 5, the aluminum layer 6 and the upper buffer metal layer 7 are stacked on the pad part and patterned to form a triple data line.

As shown in FIG. 1C, a SiNx film is formed as an insulation film 8 on the entire upper surface of the resulting structure, and at the TFT part, the upper buffer metal layer 7 at the upper portion of the drain region is selectively etched to be partially exposed, and at the pad part, the upper buffer metal layer 7 of the data line is selectively etched to be partially exposed.

As shown in FIG. 1D, a transparent electrode 9 is formed on the entire upper surface of the resulting structure and then patterned to be in contact with the upper buffer metal layer 7 exposed on the TFT part and the pad part.

However, the data line forming method of a conventional liquid crystal display device, as described above, has the following problem, that is, in order to implement the low resistant data lines, the triple film structure with the stacked lower buffer metal layer/aluminum layer/upper buffer metal layer is adopted. However, the time required for the process of deposition and patterning is increased, causing a loss in yield and an increase in manufacturing cost.

SUMMARY OF THE INVENTION

Therefore, an object of the present invention is to provide a method for forming a data line of a liquid crystal display device that is capable of shortening the time required for the process of depositing and patterning without degrading line characteristics, by adopting a double film structure to the data lines.

To achieve these and other advantages and in accordance with the purpose of the present invention, as embodied and broadly described herein, there is provided a method for forming data lines of a liquid crystal display which includes the steps of: sequentially forming a first insulation film, a buffer metal layer and an aluminum layer on a pad part of a glass substrate; forming a double data line by patterning the aluminum layer and the buffer metal layer and forming a contact hole so that a portion of the first insulation film, at the lower portion of the double data line, is exposed; forming a second insulation film on the entire upper surface of the resulting structure and patterning it so that the contact hole region can be exposed; and forming a transparent electrode at the entire upper portion of the resulting structure so that the transparent electrode can be in side-contact with the aluminum layer and the buffer metal layer through the exposed contact hole region.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

FIGS. 2A through 2D are sequential sectional views showing a method for forming data lines of a liquid crystal display device proceeding in the data pad part in accordance with the present invention.

Figure 1A:
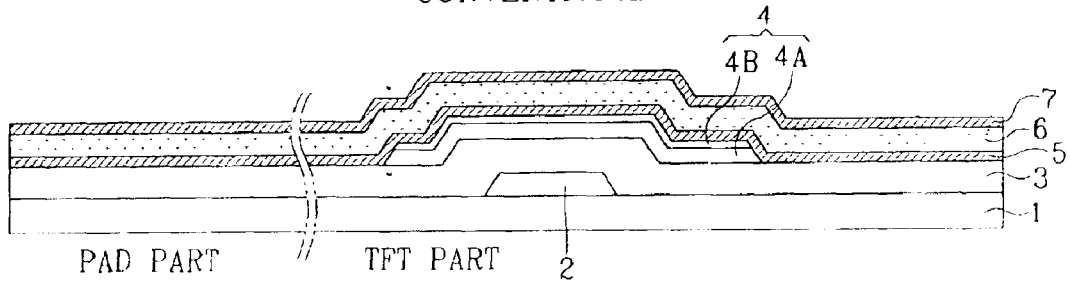
FIG. 1 is a sequential sectional view showing a method for forming data lines of a liquid crystal display device in accordance with conventional art.
Figure 1B:
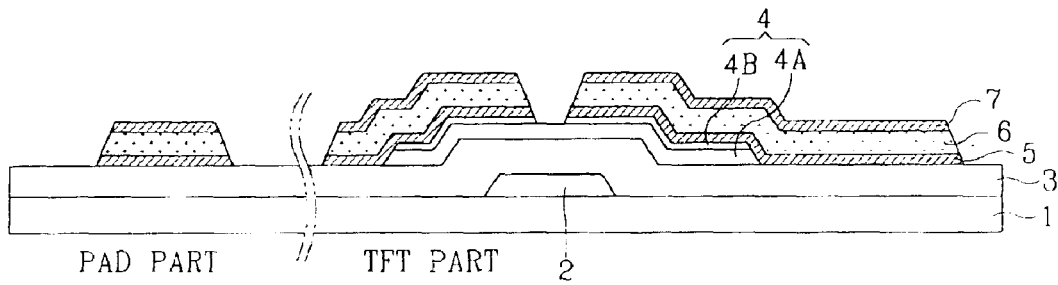
Figure 1C:
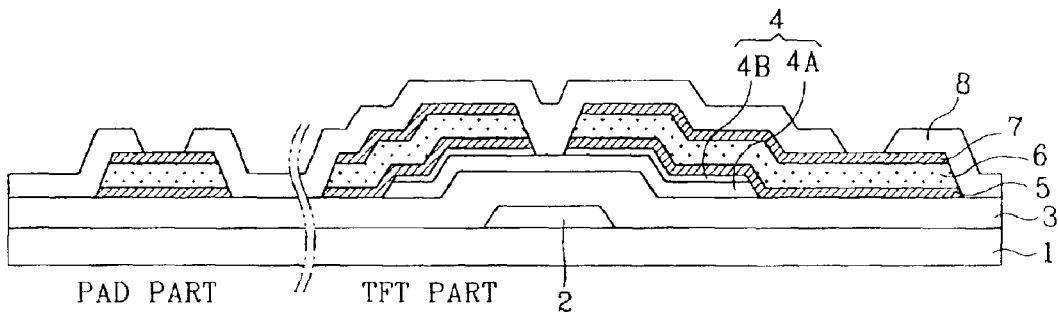
Figure 1D:
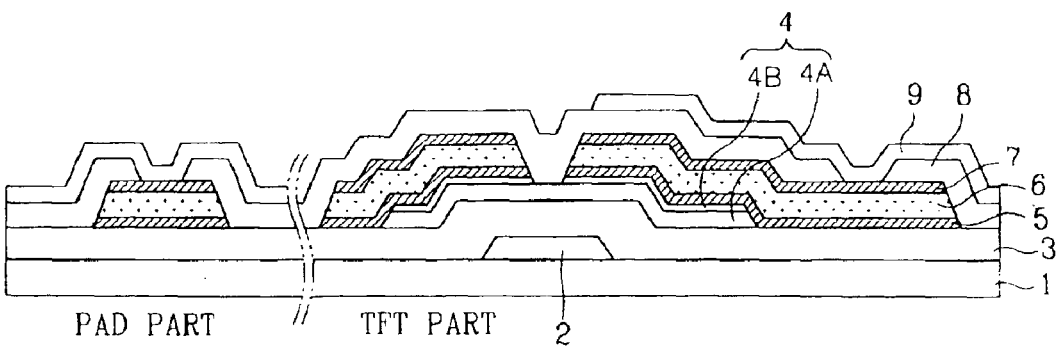
Figure 2A:
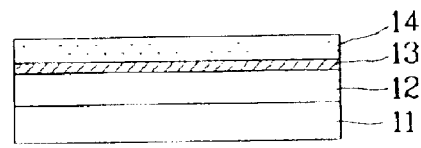
FIGS. 2A through 2D are sequential sectional views showing a method for forming data lines of a liquid crystal display device proceeding in a data pad part, in accordance with the present invention.

First, as shown in FIG. 2A, a first insulation film 12, a buffer metal layer 13 and an aluminum layer 14 are sequentially formed on a pad part of a glass substrate 11. At this time, a metal material such as Cr, Mo, MoW or Ti of Group VI or Group 3A of the periodic table is adopted as the buffer metal layer 13 to prevent the occurrence of a spiking phenomenon caused when the aluminum layer 14, the metal line, is diffused to the lower film.

Figure 2B:
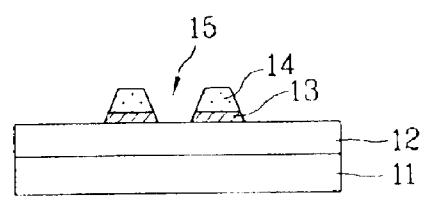

Next, as shown in FIG. 2B, the stacked aluminum layer 14 and the buffer metal layer 13 are patterned to form a double data line, and at the same time, a contact hole 15 is formed so that a portion of the first insulation film 12 at the lower portion of the double data line can be exposed.

At this time, in the case of utilizing the metal Mo for the buffer metal layer 13, the aluminum layer 14 and the buffer metal layer 13 can be simultaneously patterned by one step of wet-etching.

On the other hand, when utilizing a metal material of such as Cr, MoW or Ti for as the buffer metal layer 13, the aluminum layer 14 and the buffer metal layer 13 can be patterned by two wet-etching steps.

Figure 2C:
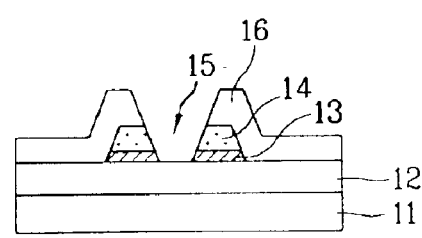

As shown in FIG. 2C, a second insulation film 16 is formed on the entire upper surface of the resulting structure and patterned so that the contact hole 15 region can be exposed.

Figure 2D:
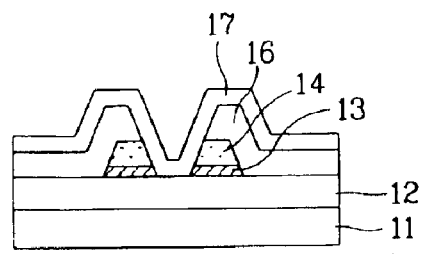

As shown in FIG. 2D, a transparent electrode 17 is formed at the entire upper surface of the resulting structure so that the transparent electrode 17 can be side-contacted with the aluminum layer 14 and the buffer metal layer 13.

As the transparent electrode 17 is side-contacted with the side of the buffer metal layer 13, the contact resistance problem of the aluminum layer 14 and the transparent electrode 17 can be solved.

Accordingly, in the method for forming data lines of a liquid crystal display device according to the present invention, since the contact resistance of the aluminum layer 14 and the transparent electrode 17 is maintained at the same level as that of conventional art while adopting the double data line, the sputter equipment use time of about 150 seconds for forming the triple data line of conventional art can be reduced to about 85 seconds by forming the double data line.

FIGS. 3A through 3D are sequential sectional views showing a method for forming data lines of a liquid crystal display device concurrently proceeding in a TFT part and a data pad part in accordance with the present invention.

Figure 3A:
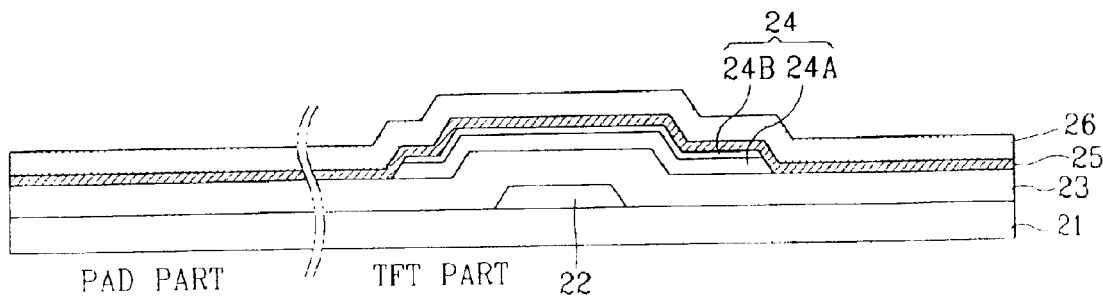
FIGS. 3A through 3D are sequential sectional views showing a method for forming data lines of a liquid crystal display device concurrently proceeding in a TFT part and a data pad part in accordance with the present invention.

First, as shown in FIG. 3A, a gate electrode 22 is patterned on the TFT part of the glass substrate 21, and a gate insulation film 23 is formed at the entire surface of the TFT part and the pad part.

An amorphous silicon layer 24A and a high density N-doping amorphous silicon layer 24B are formed at an upper portion of the gate insulation film 23 and patterned to form an active layer 24 assigned with the gate electrode 22.

Figure 3B:
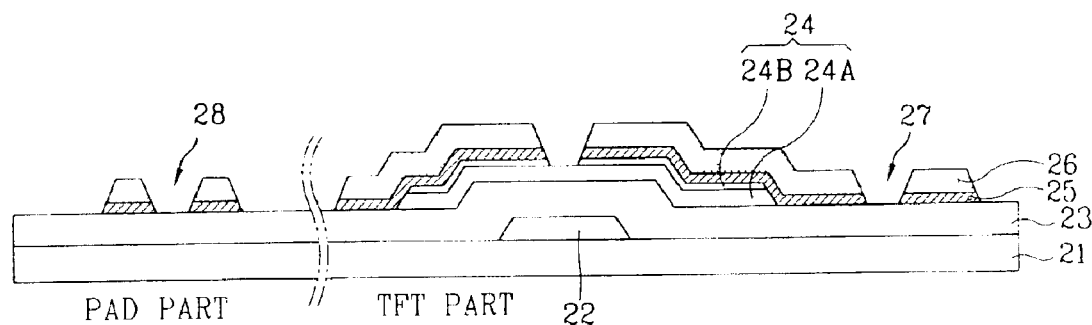

Next, as shown in FIG. 3B, the buffer metal layer 25 and the aluminum layer 26 are formed on the resulting structure, and the TFT part is patterned until a portion of the amorphous silicon layer 24A on the gate electrode 22 is exposed so as to separate the source/drain regions, and also is patterned so that a portion of the gate insulation film 23 at the lower portion of the drain region can be exposed to form a first contact hole 27.

At the same time, at the side of the pad part, the buffer metal layer 25 and the aluminum layer 26 are patterned to form a double data line, and a second contact hole 28 is formed so that a portion of the gate insulation film 23 at the lower side of the double data line can be exposed.

At this time, when Mo is used as the buffer metal layer 25, the aluminum layer 26 and the buffer metal layer 25 can be simultaneously patterned by one wet-etching. If other metal materials such as Cr, MoW or Ti is used for the buffer metal layer 25, the aluminum layer 26 and the buffer metal layer 25 can be patterned through two time of wet-etching.

Figure 3C:
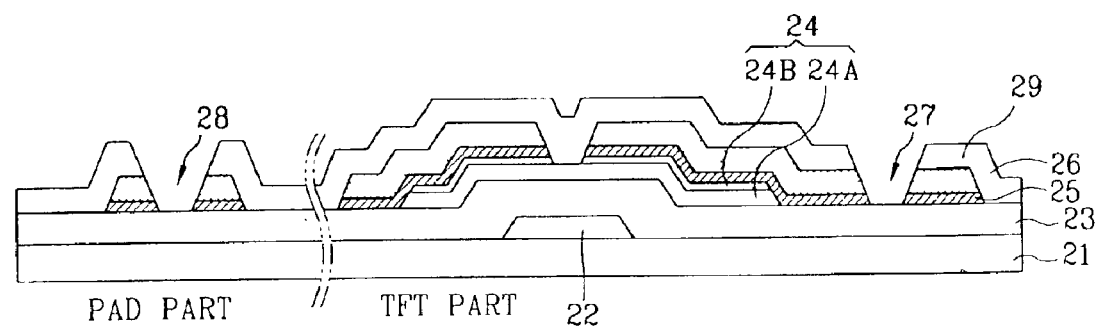

And, as shown in FIG. 3C, an insulation film 29 is formed at the entire upper surface of the resulting structure, and patterned so that the first and second contact holes 27 and 28 can be exposed.

Figure 3D:
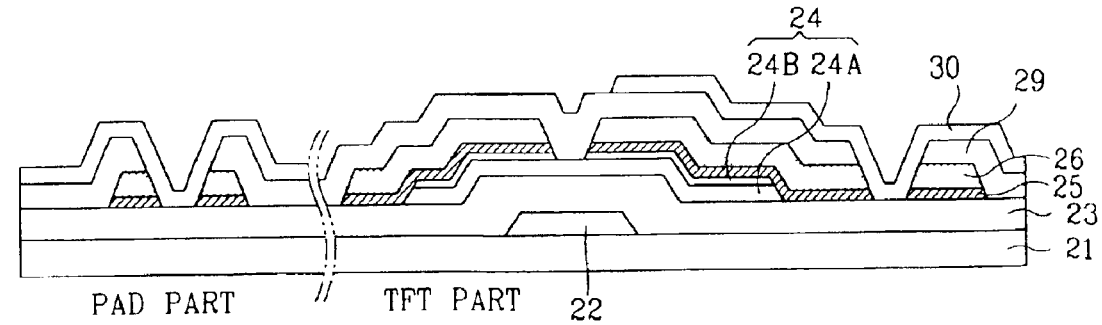

And, as shown in FIG. 3D, a transparent electrode 30 is formed at an entire upper surface of the resulting structure and patterned, so that the aluminum layer 26 and the buffer metal layer 25 are respectively side-contacted through the exposed first and second contact hole regions 27 and 28.

Accordingly, as described above, the data line forming process of the pad part can proceed simultaneously with the processing of the TFT part, so that there is no restraint or limitation on mass-production.

As so far described, the method for forming data lines of a liquid crystal display device of the present invention has the following advantages.

Since the contact resistance with the transparent electrode is maintained at the same level as that of the conventional art while adopting the double data line, the sputter equipment use time, which was about 150 seconds for forming the triple data line in the conventional art, can be reduced to about 85 seconds. Thus, the yield rate can be improved and the fabrication cost can be reduced.

In addition, the double data line of the pad part is used as a source/drain region at the TFT part, so that the CD bias of the source/drain region metal layer can be accordingly improved.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A method for forming data lines of a liquid crystal display device comprising the steps of:
   sequentially forming a first insulation film, a buffer metal layer and an aluminum layer on a pad part of a substrate;
   forming a double data line by patterning the aluminum layer and the buffer metal layer and at the same time forming a contact hole, so that a side portion of the double data line is exposed;
   forming a second insulation film at the entire upper surface of the resulting structure and patterning it so that the contact hole region is exposed; and
   forming a transparent electrode at the entire upper portion of the resulting structure so that the transparent electrode is contacted with the side portion of the aluminum layer and the buffer metal layer through the region of the exposed contact hole.

2. The method of claim 1, wherein the buffer metal layer is a metal material selected from the group consisting of Cr, Mo, MoW and Ti.

3. The method of claim 2, wherein the metal material is Mo which is simultaneously patterned with the aluminum layer by one step wet-etching.

4. The method of claim 2, wherein the buffer layer is patterned separately from the aluminum layer.

5. The method of claim 1, wherein the substrate is a glass substrate.

6. The method of claim 1, wherein the step of forming the double data line is performed by sputtering.

7. The method of claim 6, wherein the sputtering is performed for less than about 150 seconds.

8. The method of claim 6, wherein the sputtering is performed for about 85 seconds.

9. The method of claim 1, wherein a contact resistance of the transparent electrode is maintained while adopting the double data line.

10. The method of claim 9, wherein CD bias of a source/drain metal layer is improved.

11. The method of claim 1, wherein CD bias of a source/drain metal layer is improved.

12. A method for forming data lines of a liquid crystal display device having a TFT part and a pad part, on a substrate, which comprises the steps of:
   patterning a gate electrode on the TFT part of the substrate and forming a gate insulation film at the entire surface of the TFT part and the pad part;
   forming an amorphous silicon layer and a high density N-doping amorphous silicon layer at an upper portion of the gate insulation film and patterning said layers to form an active layer aligned with the gate electrode;
   forming a buffer metal layer and an aluminum layer on the resulting structure;
   patterning the buffer metal layer and the aluminum layer until a portion of the amorphous silicon layer on the gate electrode is exposed to separate source/drain regions;
   patterning the buffer metal layer and the aluminum layer to expose a portion of the gate insulation film at the lower portion of the drain region, forming a first contact hole at the side of the TFT part, and at the same time, patterning the buffer metal layer and the aluminum layer of the pad part to form a double data line and at the same time form a second contact hole, whereby a portion of a side of the double data line is exposed;
   forming an insulation film at an entire upper surface of the resulting structure and patterning it so that the first and second contact hole regions are exposed; and
   forming a transparent electrode at an entire upper surface of the resulting structure and patterning it so that it contacts on the surface of the aluminum layer and the buffer metal layer through the exposed first contact hole region and contacts at least a portion of a side of the buffer metal layer through the exposed contact hole.

13. The method of claim 12, wherein the buffer metal layer is a metal material selected from the group consisting of Cr, Mo, MoW and Ti.

14. The method of claim 12, wherein the step of forming the buffer metal layer and the aluminum layer is performed by sputtering.

15. The method of claim 14, wherein the sputtering is performed for less than about 150 seconds.

16. The method of claim 14, wherein the sputtering is performed for about 85 seconds.

17. The method of claim 12, wherein the TFT part and the pad part are formed simultaneously.

18. The method of claim 12, wherein a contact resistance of the transparent electrode is maintained while adopting the double data line.

19. The method of claim 18, wherein CD bias of a source/drain metal layer is improved.

20. The method of claim 12, wherein CD bias of a source/drain metal layer is improved.

* * * * *